(12) United States Patent
Shibusawa

(10) Patent No.: US 9,511,749 B2
(45) Date of Patent: Dec. 6, 2016

(54) WIPER WASHER APPARATUS

(71) Applicant: Fuji Jukogyo Kabushiki Kaisha, Tokyo (JP)

(72) Inventor: Tomoo Shibusawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 272 days.

(21) Appl. No.: 14/476,400

(22) Filed: Sep. 3, 2014

(65) Prior Publication Data

US 2015/0082574 A1    Mar. 26, 2015

(30) Foreign Application Priority Data

Sep. 26, 2013   (JP) ................................. 2013-199974

(51) Int. Cl.
   *B60S 1/46*    (2006.01)
   *B60S 1/48*    (2006.01)
   *B60S 1/52*    (2006.01)

(52) U.S. Cl.
   CPC .................. *B60S 1/482* (2013.01); *B60S 1/522* (2013.01)

(58) Field of Classification Search
   CPC ............ B60S 1/46; B60S 1/48; B60S 1/481; B60S 1/482; B60S 1/485
   USPC ......... 15/250.01, 250.02, 250.04; 239/284.1; 318/443, 444, 445, 484, DIG. 2
   See application file for complete search history.

(56) References Cited

U.S. PATENT DOCUMENTS

| | | | | |
|---|---|---|---|---|
| 3,632,907 A | * | 1/1972 | Gleeson | ................. B60S 1/482 200/4 |
| 4,720,664 A | * | 1/1988 | Iwamoto | ................. B60S 1/482 15/250.17 |
| 5,811,950 A | * | 9/1998 | Lawson | ................. B60S 1/481 15/250.13 |
| 7,735,183 B2 | | 6/2010 | Harita | |
| 7,748,075 B2 | * | 7/2010 | Nakano | ................. B60S 1/486 15/250.02 |
| 2005/0206511 A1 | | 9/2005 | Heenan et al. | |
| 2008/0229537 A1 | | 9/2008 | Harita | |

FOREIGN PATENT DOCUMENTS

| | | |
|---|---|---|
| JP | H04-365655 A | 12/1992 |
| JP | 2004-243937 A | 9/2004 |
| JP | 2006-143150 A | 6/2006 |

(Continued)

OTHER PUBLICATIONS

JPO Decision to Grant dated Dec. 8, 2015 with an English translation thereof.

(Continued)

*Primary Examiner* — Gary Graham
(74) *Attorney, Agent, or Firm* — McGinn IP Law Group, PLLC

(57) ABSTRACT

A wiper washer apparatus sprays a washer liquid onto a windshield of a vehicle that has imaging areas of an imaging device and wipes the windshield. The apparatus includes a wiper arm that reciprocates a blade so as to wipe a predetermined wiping area, a spray unit that sprays the washer liquid onto the wiping area on the windshield from a nozzle provided on the wiper arm, a drive unit that drives the wiper arm in a mode selected from modes including at least a low speed mode and a high speed mode, and an input unit through which a user inputs a command for spraying the washer liquid.

1 Claim, 3 Drawing Sheets

(56) References Cited

FOREIGN PATENT DOCUMENTS

| JP | 2008-6971 A | 1/2008 |
| JP | 2008-006971 A | 1/2008 |
| JP | 2008-068655 A | 3/2008 |
| JP | 2009-113629 A | 5/2009 |
| JP | 2012-201178 A | 10/2012 |

OTHER PUBLICATIONS

JPO Notification of Refusal dated Jul. 28, 2015 with an English translation thereof.

* cited by examiner

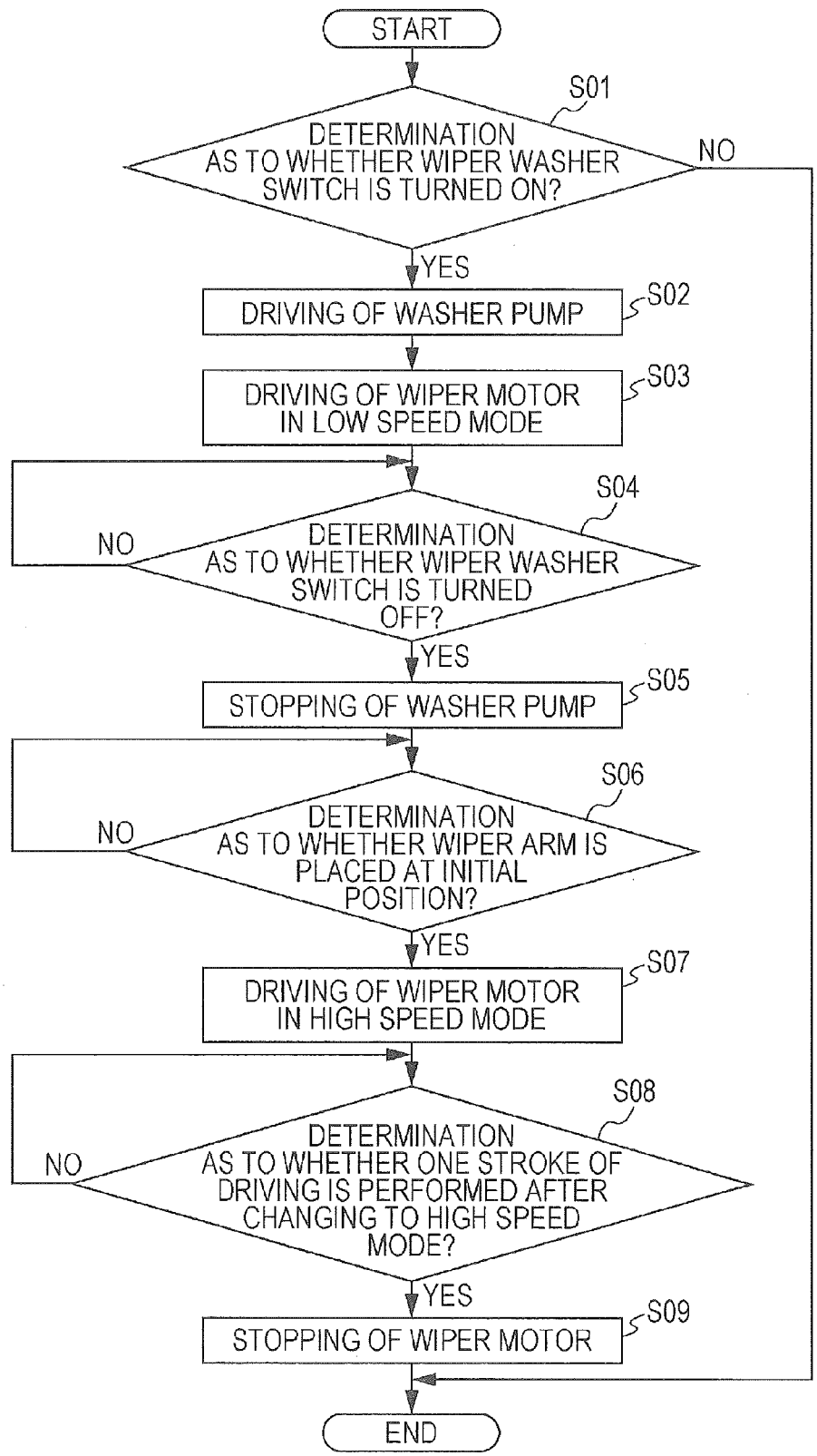

WIPER WASHER APPARATUS

CROSS-REFERENCE TO RELATED APPLICATIONS

The present application claims priority from Japanese Patent Application No. 2013-199974 filed on Sep. 26, 2013, the entire contents of which are hereby incorporated by reference.

BACKGROUND

1. Technical Field

The present invention relates to a wiper washer apparatus that wipes a windshield of a vehicle such as an automobile by spraying a washer liquid onto the windshield from a nozzle provided on a wiper arm, and more particularly relates to the wiper washer apparatus that can quickly recover visibility in an imaging area of an imaging device after spraying the washer liquid.

2. Related Art

A windshield of a vehicle such as an automobile is provided with a wiper washer apparatus including a washer device that sprays a washer liquid (a washing liquid) and a washer device that wipes the washer liquid, rain, and the like.

The wiper device has a wiper arm provided with a blade made of a rubber material. The wiper arm pivots on the windshield so as to reciprocate within a predetermined wiping area on the windshield, thereby wiping water or the like on the windshield.

Generally, the washer device has a nozzle fixed on a front hood or a cowl top of a vehicle and the nozzle sprays washer liquid onto the windshield. Recently, it has been proposed that the washer device have a wiper arm provided with a nozzle. Such a wiper arm is called as a wet arm.

For example, Japanese Unexamined Patent Application Publication (JP-A) No. 2008-6971 discloses a wiper washer apparatus in which a wiper arm is provided with a nozzle for spraying a washer liquid. The apparatus is provided with a spray unit that sprays the washing liquid (the washer liquid) onto the wiper blade. In order to prevent the washing liquid from remaining on or dripping onto the windshield immediately after wiping, more than one wiping operation is performed without spraying the washing liquid.

Recently, the use of an imaging device such as a stereo camera that captures a front view from a vehicle and that is provided on the vehicle interior side of a windshield so as to control the vehicle for the sake of pre-crash safety, driving support, and the like has become widespread. In a vehicle having the imaging device, an imaging operation may be subject to detrimental effects and control of the vehicle will be affected.

In the technique disclosed in JP-A No. 2008-6971, it is possible to prevent a washer liquid from remaining on a windscreen after wiping by performing an additional wiping operation after spraying of the washer liquid has been stopped. However, even in such a case, it is unavoidable that the imaging operation will be temporarily negatively affected until the wiping operation finishes.

SUMMARY OF THE INVENTION

Accordingly, an object of the present invention is to provide a wiper washer apparatus that can quickly recover visibility in an imaging area of an imaging device after spraying a washer liquid.

In order to achieve the above object, an aspect of the present invention provides a wiper washer apparatus that that sprays a washer liquid onto a windshield of a vehicle and wipes the windshield, the vehicle having an imaging area through which an imaging device captures a front view from the vehicle. The wiper washer apparatus includes: a wiper arm that has a blade pressed on the windshield and reciprocates the blade between a first return position and a second return position such that the blade wipes a predetermined wiping area including the imaging area; a spray unit that sprays the washer liquid onto the wiping area on the windshield from a nozzle provided on the wiper arm; a drive unit that drives the wiper arm in a mode selected from modes including at least a low speed mode and a high speed mode; and an input unit through which a user inputs a command for spraying the washer liquid. The spray unit begins to spray the washer liquid in response to the start of an operation of the input unit by the user and stops spraying the washer liquid in response to the end of the operation of the input unit by the user. The drive unit begins to drive the wiper arm in response to the start of the operation of the input unit by the user and stops driving the wiper arm after spraying the washer liquid from the spray unit and after driving the wiper arm in at least one of reciprocating strokes between the first return position and the second return position in the high speed mode.

The drive unit may drive the wiper arm in the low speed mode while the spray unit sprays the washer liquid.

BRIEF DESCRIPTION OF THE DRAWINGS

FIG. 3 is a flow chart which illustrates an operation of spraying a washer liquid in the example of the wiper washer apparatus.

DETAILED DESCRIPTION

The invention resolves an issue to provide a wiper washer apparatus that can quickly recover visibility in an imaging area of an imaging device after finishing spraying of a washer liquid by driving a wiper arm in a high speed mode by at least one reciprocating motion.

An example of a wiper washer apparatus to which the invention is applied will be described below.

The example of the wiper washer apparatus is provided on, for instance, a windshield in a vehicle such as a passenger car having an imaging device that captures a front view from the vehicle.

Figure 1:
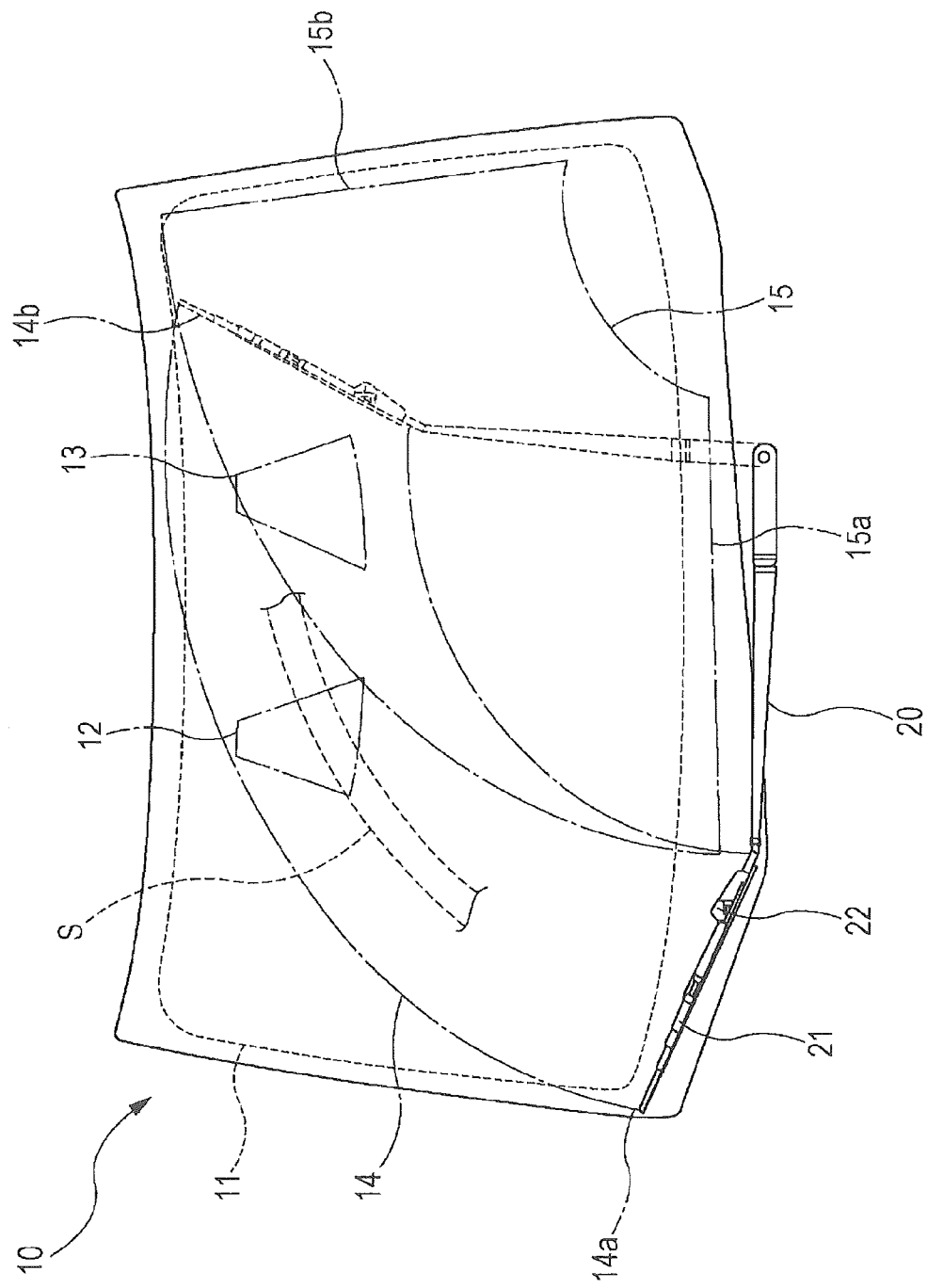
FIG. 1 is a plan view of a windshield in a vehicle provided with an example of a wiper washer apparatus to which the present invention is applied.

FIG. 1 illustrates a windshield in the vehicle provided with the example of the wiper washer apparatus to which the invention is applied. A windshield 10 is arranged on a front section in a vehicle interior (cabin), not illustrated, in a vehicle such as a passenger car and is mounted in a frame for a windscreen that occupies a main view observed by a driver. The windshield 10 has an elongated rectangular shape when viewed from a front side and is made of a laminated glass, a central portion of which is curved forward with respect to opposite end portions in two dimensions. The windshield 10 is provided on a boundary line 11 around an inner periphery of the windshield 10 with a black ceramic layer. The area inside the boundary line 11 is substantially transparent.

Imaging areas 12 and 13 of a stereo camera device (not illustrated) are located in the vicinity of an upper end of the windshield 10. The stereo camera device has a pair of cameras arranged on the right and left sides in the width direction of the vehicle. The stereo camera device can recognize the environment in front of the vehicle, for instance, a relative position or a relative speed between the vehicle in question and other vehicles or pedestrians in front of the vehicle, and the shape of a traffic lane by using known imaging technology. The stereo cameras are disposed on a roof front end (in the vicinity of the base of a cabin mirror) in the vehicle interior.

The imaging areas 12 and 13 are included in fields of view of the right and left cameras on the windshield 10. The stereo cameras capture an environment in front of the vehicle through the imaging areas 12 and 13.

The windshield 10 is provided with a wiper arm (not illustrated) on the driver seat side and with a wiper arm 20 on the front passenger seat side. The wiper arm 20 is driven by a wiper motor 33 (not illustrated in FIG. 1 but illustrated in FIG. 2). The wiper arm 20 is pivoted around a rotary axis provided on the central portion in a width direction of the vehicle on a cowl of the vehicle (not illustrated) adjacent to a lower end of the windshield 10.

The wiper arm 20 includes a blade 21 and a washer nozzle 22. The blade 21 is provided in the vicinity of a distal end of the wiper arm 20. The blade 21 has a fin-like wiping element (not illustrated) made of a rubber material and extending along the wiper arm 20 in its longitudinal direction. The washer nozzle 22 sprays a washer liquid (a washing liquid) onto a surface of the windshield 10. The washer nozzle 22 is disposed in the vicinity of an end of the blade 21 at the side of a rotary axis of the wiper arm 20. The washer nozzle 22 can spray the washer liquid in a moving direction of the wiper arm 20 when the wiper arm 20 moves from an initial position to a return position.

The movements of the blade 21 of the wiper arm 20 on the front passenger seat side and the blade (not illustrated) of the wiper arm on the driver seat side define the wiping areas 14 and 15 in FIG. 1, respectively. The respective wiping areas 14 and 15 have substantially sector-like shapes which have radii extending from initial positions 14a and 15a to return positions 14b and 15b.

The imaging area 13 at the side of the driver seat is included in the wiping areas 14 and 15. When each wiper arm is pivoted by one reciprocating motion, each of the right and left blades wipes the surface of the windshield 10. On the other hand, the imaging area 12 on the front passenger seat side is substantially included in only the wiping area 14 and is substantially wiped by only the blade 21 on the front passenger seat side.

The washer nozzle 22 is provided on the wiper arm 20 on the front passenger seat side in order to improve the wiping function in the imaging area 12 located on the front passenger seat side.

In the example of the washing apparatus, a fixed type nozzle may be provided on the cowl or the hood of the vehicle in addition to the washer nozzle 22 provided on the wiper arm 20.

Figure 2:
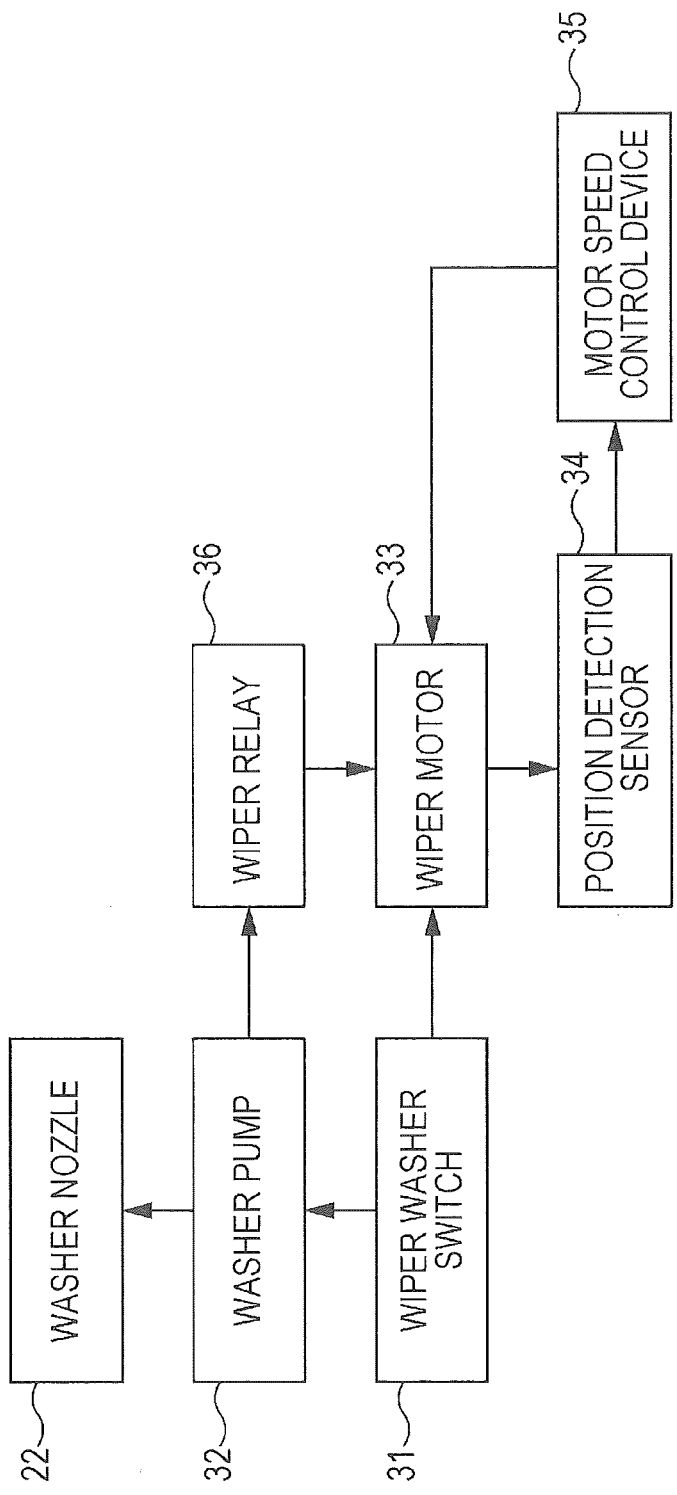
FIG. 2 is a block diagram which illustrates a configuration of the example of the wiper washer apparatus.

FIG. 2 is a block diagram which illustrates a configuration of the example of the wiper washer apparatus. As illustrated in FIG. 2, the wiper washer apparatus includes a wiper washer switch 31, a washer pump 32, a wiper motor 33, a position detection sensor 34, a motor speed control device 35, a wiper relay 36, and the like.

The wiper washer switch 31 generates an input signal that starts a wiping operation of the wiper arm and a spraying operation of the washer liquid in response to an operation of a user such as a driver. The wiper washer switch 31 is, for instance, a lever that projects from a steering column.

The washer pump 32 is an electric pump that pressurizes a washer liquid (a washing liquid) stored in a washer tank (not illustrated) and supplies the washer liquid to the washer nozzle 22. The washer pump 32 is secured to a lower portion of the washer tank.

The wiper motor 33 drives the wiper arms on the driver seat side and on the front passenger seat side, respectively. An output from the wiper motor 33 is transmitted through a reduction gear train and a link mechanism to the respective wiper arms so as to pivot and reciprocate the respective wiper arms between the initial position and the return position.

The position detection sensor 34 detects a position of the wiper arm 20 by detecting a state of the link mechanism provided on an output element of the wiper motor 33. The position detection sensor 34 detects a time when the wiper arm 20 reaches the initial position and transmits the detected signal to the motor speed control device 35.

The motor speed control device 35 shifts the rotational speed of the wiper motor 33 between a low speed mode and a high speed mode.

The wiper relay 36 stops an operation of the washer pump 32 and controls an operating time period of the wiper motor 33 (the number of movements of the wiper arm).

An operation of the example of the wiper washer apparatus will be described below.

FIG. 3 is a flow chart which illustrates an operation of spraying the washer liquid in the example of the wiper washer apparatus. Every step will be described in sequence below.

<Step S01: Determination as to Whether the Wiper Washer Switch is Turned on>

In the case where the wiper washer switch 31 is turned on by the driver (user), the process proceeds to Step S02. In the case where the wiper washer switch 31 is turned off by the driver (user), the series of operations finishes (return to start).

<Step S02: Driving of the Washer Pump>

The washer pump 32 is driven such that the pressurized washer liquid is supplied to the washer nozzle 22 and is sprayed from the washer nozzle 22. Next, the process proceeds to Step S03.

<Step S03: Driving of the Wiper Motor in the Low Speed Mode>

The wiper motor 33 carries out the wiping operation of the wiper arm in the low speed mode. An operating speed in the low speed mode is set in consideration of a condition in which the washer liquid sprayed from the washer nozzle 22 is substantially distributed throughout the whole length of the blade 21 within the time period when the wiper arm moves from the initial position to the return position. The washer liquid sprayed from the washer nozzle 22 flows toward the distal end of the blade 21 by centrifugal force while the washer liquid is being wiped upward on the surface of the windshield. Next, the process proceeds to Step S04.

<Step S04: Determination as to Whether the Wiper Washer Switch is Turned Off>

In the case where the wiper washer switch 31 is turned from an "on" state to an "off" state, the process proceeds to Step S05. On the other hand, in the case where the wiper washer switch 31 keeps the "on" state, Step S04 is repeated.

<Step S05: Stopping of Washer Pump>

The washer pump 32 is stopped and the spraying operation of the washer liquid is finished. Next, the process proceeds to Step S06.

<Step S06: Determination as to Whether the Wiper Arm is Placed at the Initial Position>

The position detection sensor 34 determines whether the wiper arm 20 has reached the initial position 14*a* for the first time after the washer pump 32 has been stopped. In the case where the wiper arm 20 has reached the initial position 14*a*, the process proceeds to Step S07. In the case where the wiper arm 20 has not reached the initial position, Step S06 is repeated.

<Step S07: Driving of the Wiper Motor in the High Speed Mode>

The motor speed control device 35 changes the rotary speed of the wiper motor 33 from a rotary speed corresponding to the low speed mode to a rotary speed corresponding to the high speed mode so as to speed up the wiping operation of the wiper arm 20. Next, the process proceeds to Step S08.

<Step S08: Determination as to Whether One Stroke of Driving is Performed after Changing to the High Speed Mode>

The position detection sensor 34 determines whether the wiper arm 20 has reciprocated one stroke between the initial position 14*a* and the return position 14*b* and has reached the initial position 14*a* after changing the rotary speed to the high speed mode. The blade 21 wipes the remainder S (FIG. 1) of the streaked washer liquid within the wiping area 14. The remainder S is made as a result of a wiping operation in which the washer liquid is not sprayed. In the case where the wiper arm 20 has reached the initial position 14*a*, the process proceeds to Step S09. In the case where the wiper arm 20 has not reached the initial position 14*a*, Step S08 is repeated.

<Step S09: Stopping of the Wiper Motor>

The wiper motor 33 is stopped. The wiping operation of the wiper arm is finished. Thereafter, the series of operations finishes (return to start).

The example of the invention described above can obtain the following effects:

(1) By reciprocating the wiper arm 20 by one stroke in the high speed mode after finishing the spraying operation of the washer liquid, it is possible to wipe the remainder S of the washer liquid or any dripped liquid on the imaging area 12 in a short time period and to reduce the time period over which an imaging process of the imaging unit is affected.

(2) By driving the wiper arm 20 in the low speed mode during spraying of the washer liquid, it is possible to secure a period of time for spreading the washer liquid throughout the whole length of the blade 21 and to secure a good wiping performance.

Modifications

It should be noted that the invention is not limited to the example described above. It is possible to alter or modify the example. These altered or modified examples fall within the technical field of the invention.

(1) A shape, a structure, an arrangement, a quantity, and the like of each element that constitutes the wiper washer apparatus are not limited to the example described above and may be altered suitably. For instance, the number and arrangement of the nozzles, and a composition of a control system can be altered suitably. Also, although the imaging device in the example includes a pair of right and left cameras, the imaging device may include a single camera.

(2) Although the wiper arm is driven in the low speed mode while spraying the washer liquid in the example, the wiper arm may be driven in the high speed mode as long as a good wiping performance can be obtained. In this case, the wiper arm is always driven in the high speed mode when the washer switch is operated.

The invention claimed is:

1. A wiper washer apparatus that sprays a washer liquid onto a windshield of a vehicle and wipes the windshield, the vehicle having an imaging area through which an imaging device captures a front view from the vehicle, the wiper washer apparatus comprising:
   a wiper arm that has a blade pressed on the windshield and reciprocates the blade between a first return position and a second return position such that the blade wipes a predetermined wiping area including the imaging area;
   a spray unit that sprays the washer liquid onto the wiping area on the windshield from a nozzle provided on the wiper arm;
   a drive unit that drives the wiper arm in a mode selected from modes including at least a low speed mode and a high speed mode; and
   an input unit through which a user inputs a command for spraying the washer liquid;
   wherein the spray unit begins to spray the washer liquid in response to the start of an operation of the input unit by the user and stops spraying the washer liquid in response to the end of the operation of the input unit by the user; and
   wherein the drive unit begins to drive the wiper arm in response to the start of the operation of the input unit by the user and stops driving the wiper arm after spraying the washer liquid from the spray unit and after reciprocating the wiper arm at least once between the first return position and the second return position in the high speed mode, and
   wherein the drive unit drives the wiper arm in the low speed mode while the spray unit sprays the washer liquid.

* * * * *